United States Patent [19]

Webber

[11] Patent Number: 4,858,109

[45] Date of Patent: Aug. 15, 1989

[54] PROGRAM CODE FETCH FROM DATA MEMORY ARRANGEMENT

[75] Inventor: Robert C. Webber, Scottsdale, Ariz.

[73] Assignee: AG Communication Systems Corporation, Phoenix, Ariz.

[21] Appl. No.: 111,471

[22] Filed: Sep. 14, 1987

Related U.S. Application Data

[63] Continuation of Ser. No. 701,704, Feb. 14, 1985, abandoned, which is a continuation-in-part of Ser. No. 412,757, Aug. 30, 1982, abandoned.

[51] Int. Cl.⁴ .............................................. G06F 12/06
[52] U.S. Cl. ................................................... 364/200
[58] Field of Search ............................... 364/200, 900

[56] References Cited

U.S. PATENT DOCUMENTS

| | | | |
|---|---|---|---|
| 4,042,911 | 8/1977 | Bourke et al. | 364/200 |
| 4,118,773 | 10/1978 | Raguin et al. | 364/200 |
| 4,156,932 | 5/1979 | Robinson et al. | 364/200 |
| 4,158,227 | 6/1979 | Baxter et al. | 364/200 |
| 4,346,441 | 8/1982 | Plank et al. | 364/200 |
| 4,368,515 | 1/1983 | Nielsen | 364/200 |
| 4,473,877 | 9/1984 | Tulk | 364/200 |
| 4,503,491 | 3/1985 | Lushtak et al. | 364/200 |

*Primary Examiner*—David L. Clark
*Attorney, Agent, or Firm*—Anthony Miologos

[57] ABSTRACT

This arrangement permits a central processing unit, which can differentiate between code and data fetches, to execute code from any number of pages of data memory without loss of access capability to any of the corresponding pages of program code memory. The page of data memory, corresponding to the program code memory page containing the control transfer programs, may not contain executable programs.

9 Claims, 1 Drawing Sheet

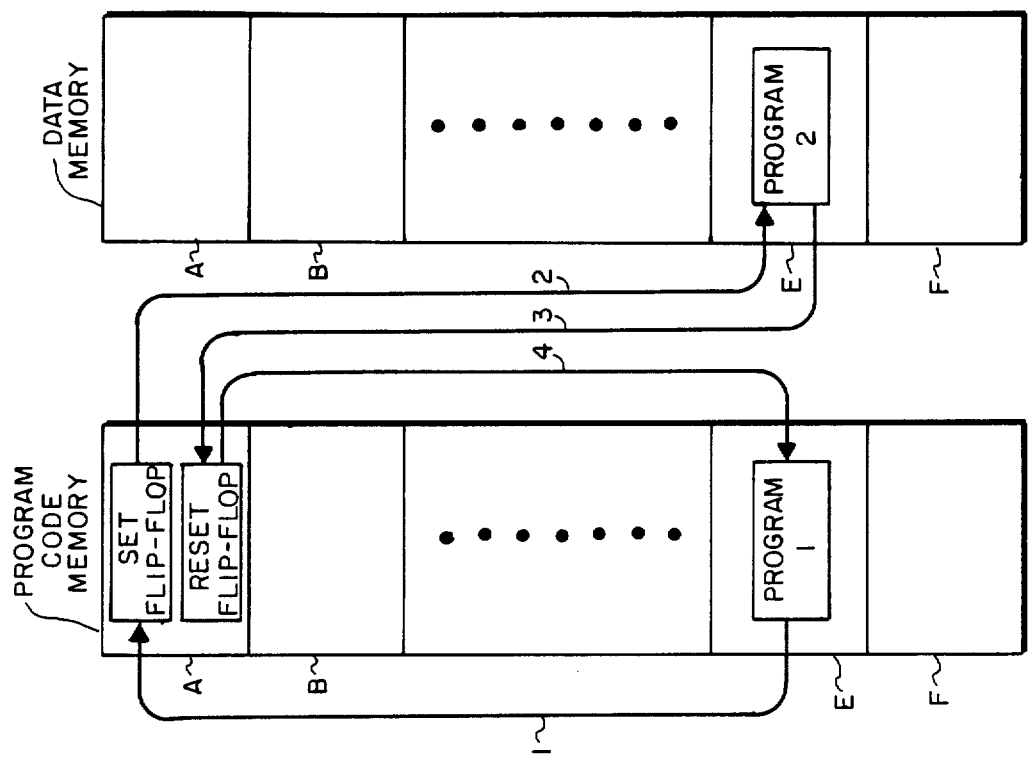
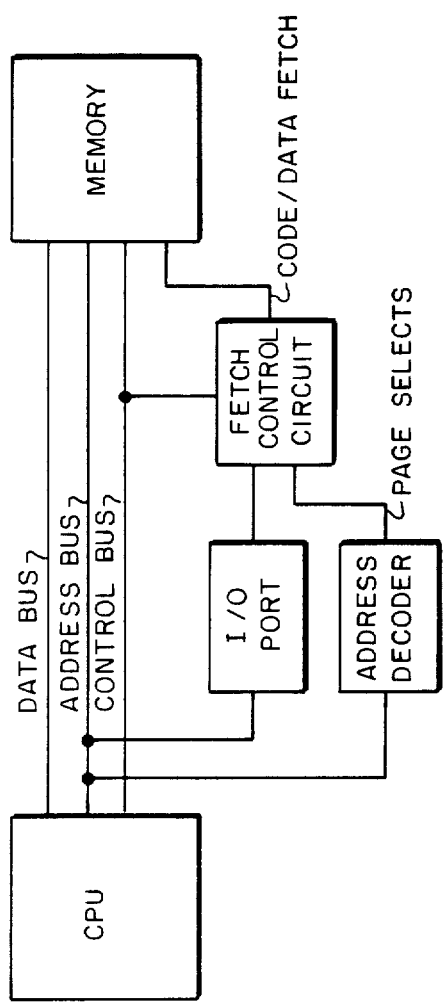
FIG. 1
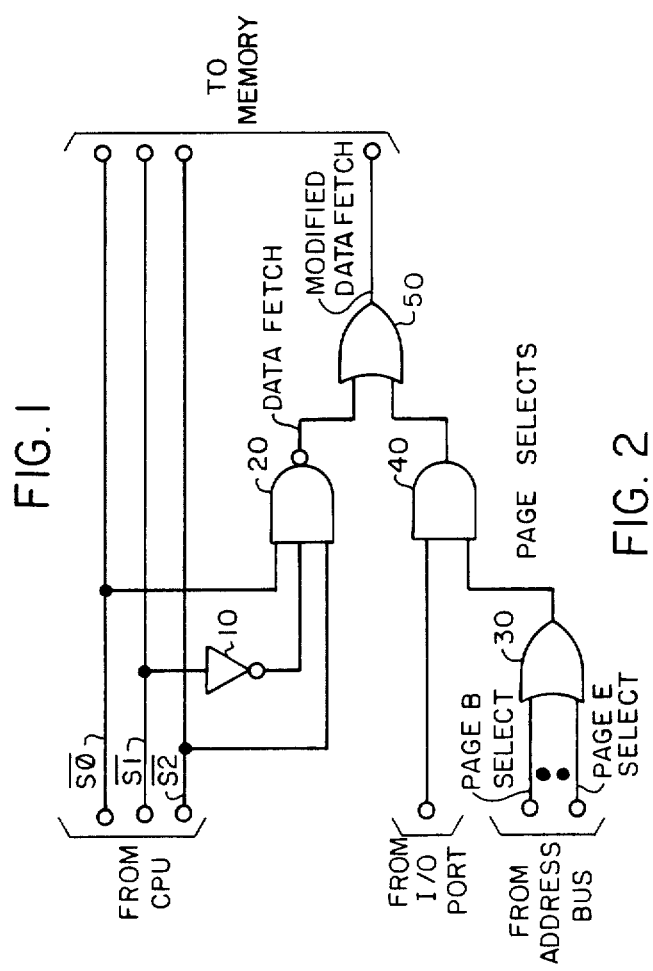
FIG. 2
FIG. 3

PROGRAM CODE FETCH FROM DATA MEMORY ARRANGEMENT

This is a continuation of co-pending application Ser. No. 701,704 filed on Feb. 14, 1985.

CROSS REFERENCE TO RELATED APPLICATONS

The present applicaton is a continuation-in-part of co-pending U.S. patent application Ser. No. 412,757, which has the same inventive entity and has as assignee the successor in all rights, titles and interest as the assignee of said co-pending application.

BACKGROUND OF THE INVENTION

The present invention pertains to central processing unit access to memory and more particularly to an arrangement for executing program code from data memory without substantial loss of corresponding program code memory.

Present day computer central processor units (CPUs) provide control information indicating the status of whether a memory read is a program code fetch or a data fetch. This control information has been used in the past in memory decoding circuitry, so that both data memory and program code memory could each utilize the full addressing capability of the CPU. For example, a processor with a 16 bit address would be able to access 64K words of data and 64K words of program code. This implementation does not provide for certain pages of the data memory to contain program code.

Other memory decoding circuitry may alot certain pages of the data memory to contain program code, but the corresponding memory page of the program code memory then could not be used for any program code storage.

Accordingly, it is the object of the present invention to provide for the allocation of program code to data memory storage without the loss of the corresponding page of the program code for the storage of program code.

SUMMARY OF THE INVENTION

The present invention permits all pages of data memory, except one, to contain program code without the loss of access to the corresponding page of the program code memory. The memory select lead derived from a central processor's control leads is employed by the memory decoding circuitry to distinguish between a program code and a data fetch. This arrangement forces the memory to produce a code fetch from data space of memory, when any, except one, of the pages dedicated to program code in the data memory space is accessed. A fetch control circuit is included between the central processing unit and memory. This fetch circuit obtains program code from the data space in memory when a latch of an input/output port controlled by the central processor unit is set, indicating that a program request is to come from data memory and one of the pages of memory containing program code in the data space is referenced. As a result, the memory decoding circuitry detects this request for a fetch as a data fetch, although the processor indicated the fetch as a program code fetch. If the input/output port is not set by the CPU to force a program fetch from data space in memory, program code from the program code memory will be fetched.

At the completion of the execution of the program in data memory, the previously set latch of the input/output is reset. Execution control is then transferred to the program which initiated the transfer to the program in data memory. As a result, all program code fetches occur from program code memory and all data fetches occur from data memory, as was the case initially.

A BRIEF DESCRIPTION OF THE DRAWINGS

FIG. 1 is a block diagram of the CPU/memory interface of the present invention.

FIG. 2 is a schematic diagram of the fetch circuitry of FIG. 1.

FIG. 3 is a memory layout depicting program control and execution.

DESCRIPTION OF THE PREFERRED EMBODIMENT

Referring to FIG. 1, a CPU, such as the Intel 8086 microprocessor, is shown connected via address, control and data buses to memory. A fetch control circuit is shown connected between the CPU and the memory. An I/O port, which provides CPU settable latches, is connected between the CPU and the fetch control circuit. In addition, an address decoder is connected between the CPU and the fetch control circuit via the address bus. The address bus of the Intel 8086 is 16 bits. However, an additional 4 bits are employed to select different pages of 64K memory.

Referring to FIG. 2, control leads $\overline{S0}$, $\overline{S1}$ and $\overline{S2}$ of the CPU's control bus indicate that the current address on the address bus is a request for program code when these signals present the binary values 1 0 1, respectively. Inverter 10 and NAND gate 20 distinguish between a data fetch and a program code fetch. NAND gate 20 provides a logic 0 output when a code fetch is beng performed. This lead would normally be transmitted directly to the memory decoders to distinguish between program code and data fetches.

An output signal of an I/O port latch is connected to one of the inputs of AND gate 40. The other input to AND gate 40 is output of OR gate 30 which decodes a selection of all memory pages, except the page of data memory corresponding to the page of program code memory that is required to contain the transfer programs. The operation of the transfer programs will be explained infra. NAND gate 20 and AND gate 40 are connected to OR gate 50, which has its output connected to the memory.

In normal operation, I/O port latch input to gate 40 is reset by the CPU program. This causes AND gate 40 to provide a logic 0 to the input of OR gate 50. As a result, the output of OR gate 50 will reflect the status of the data fetch signal output by NAND gate 20 and all program code fetches will occur from the program code memory space of memory and all data fetches will occur from the data space of memory.

Referring to FIGS. 2 and 3, program one resident in page E of the program code space requires that program two, which is located in page E of the data space, be given control. Program one transfers intermediate control to the SET FLIP-FLOP transfer program indicated by transfer 1 in FIG. 3. The SET FLIP-FLOP program sets the latch connected to the input to OR gate 40 and transfers control to program two indicated by transfer 2. As a result, for memory references made to page E, the corresponding program operation codes are fetched from the data space of page E. Since the I/O port latch is set and OR gate 30 is set, AND gate 40 will produce a logic 1 signal which will be transmitted through OR gate 50 indicating that data is to be fetched from memory. In actuality, this apparent data will be program code from the data space. However, control leads $\overline{S0}$, $\overline{S1}$ and $\overline{S2}$ indicate that the processor requested a program code fetch. Thereby, program two will have been executed while being resident in the data space of page E.

When the execution of program two is complete, control will be returned to program one via another intermediate transfer program, RESET FLIP-FLOP, indicated by transfer 3. The RESET FLIP-FLOP transfer program resets the previously set latch of the I/O port and then returns control to program one indicated by transfer 4. The CPU then reverts back to its normal mode of processing all program code fetches from program code memory and all data fetches from data memory.

It is to be noted that the intermediate programs SET FLIP-FLOP and RESET FLIP-FLOP cannot be located on the same program code page in which any target programs located in the data space reside.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a real time on-line computer processing system, a program code fetch from data memory arrangement for fetching program code from program code memory and from data memory, said program code fetch from data memory arrangement comprising:

a CPU for providing a program code fetch request;

memory including a plurality of pages of program code memory and a plurality of pages of data memory;

a data bus connected between said CPU and said memory, said data bus providing for writing data into said memory or for reading data from said memory;

a control bus connected between said CPU and said memory, said control bus including a plurality of status leads for transmitting signals indicating whether a next fetch from said memory is to be a program code fetch or a data fetch;

an address bus connected between said CPU and said memory;

Input/Output means connected to said address bus and to said CPU, said Input/Output means operating in response to an address of said address bus to produce a first output signal of a first value, said address indicating that said program code fetch is to occur from data memory, said first output signal otherwise being of a second value;

decoding means connected and responsive to said address bus and to said Input/Output means, said decoding means enabled by said first value of said first output signal to produce a first value of a second output signal indicating a presence of an allowable memory page address of a said data memory contained on said address bus, said second signal otherwise being of a second value;

first means for detecting on said status leads a request for data memory to produce a seventh output signal of a first value, otherwise said seventh output signal being of a second value, said first means for detecting connected to said control bus; said second means for detecting connected to said first means for detecting and to said decoding means, said second means for detecting responsive to said first values of said seventh and second output signals to produce a third signal for transmission to said memory to enable said data memory to transmit said program code to said CPU via said data bus; and said second means for detecting further responsive to said second values of said seventh and second output signals for fetching said program code from said program code memory.

2. A program code fetch from data memory arrangement as claimed in claim 1, wherein said Input/Output means includes:

a latch for indicating that all program code fetches are to occur from data memory;

first program means operating in response to said first signal to set said latch indicating that all program code fetches are to occur from data memory.

3. A program code fetch from data memory arrangement as claimed in claim 2, wherein said Input/Output means further includes:

second program means operating in response to said first signal to reset said latch indicating that all program code fetches occur from said program code memory.

4. A program code fetch from data memory arrangement as claimed in claim 3, wherein said first means for detecting includes:

inverter means connected to a first one of said status leads;

first gating means connected to at least a second and a third status lead of said plurality of status leads and said first gating means connected to said inverter means, said first gating means operating in response to a data fetch request from said CPU to produce a third signal, values of said third signal indicating a data fetch or a program code fetch.

5. A program code fetch from data memory arrangement as claimed in claim 4, wherein said address bus includes:

a plurality of leads each lead having values which represent a memory address to be written into or read from; and a plurality of page leads indicating which one of said plurality of pages of data memory and which one of said plurality of pages of program code memory from which to fetch.

6. A program code fetch from data memory arrangement as claimed in claim 5, wherein said decoding means includes OR gating means connected to all, but one of said plurality of page leads and connected to said second means for detecting.

7. A program code fetch from data memory arrangement as claimed in claim 6, wherein said second means for detecting includes second gating means connected to said latch and to said OR gating means, said second gating means operating in response to a program code fetch request from data memory in combination with a selection of one of said allowable plurality of said memory pages as indicated by said page leads to produce a fourth signal indicating that a program code fetch is to occur from data memory.

8. A program code fetch from data memory arrangement as claimed in claim 7, wherein said second means for detecting further includes third gating means connected to said memory, to said first and to said second gating means, said third gating means operating in response to said third signal to produce fifth signal indicating that data is to be fetched from said data memory or alternatively said third gating means operated in response to said fourth signal to produce a sixth signal indicating that program code is to be fetched from said allowable page of said data memory.

9. A program code fetch from data memory arrangement as claimed in claim 4, wherein said first gating means includes a NAND gate connected to said second and third status leads and to said first status lead via said inverter means.

* * * * *